Jan. 6, 1970     A. LEGER, JR., ETAL     3,487,698
PERCENTAGE FAT ANALYZER
Filed Feb. 6, 1967     4 Sheets-Sheet 1

INVENTORS.
ALTON LEGER, JR.
ROBERT C. WHITEHEAD, JR.
BY
G. Donald Weber
ATTORNEY.

INVENTORS.
ALTON LEGER, JR.
ROBERT C. WHITEHEAD, JR.

BY J. Donald Welauf
ATTORNEY.

Jan. 6, 1970   A. LEGER, JR., ET AL   3,487,698
PERCENTAGE FAT ANALYZER
Filed Feb. 6, 1967   4 Sheets-Sheet 4

START PROCESS
START TIMER
PRESSURIZE BLADDER
VOLUME POT LOCKS
RAISE DIE LOCK ON
DEPRESSURIZE BLADDER
RAISE DIE
RAISE DIE LIGHT OFF
LIFT SCALE
READOUT UNLOCKS
READOUT LOCKS
LOWER SCALE
VOLUME POT UNLOCKS
READ OUT LIGHT OFF
END CYCLE

INVENTORS.
ALTON LEGER, JR.
ROBERT C. WHITEHEAD, JR.
BY
J. Donald Welsh Jr.
ATTORNEY.

United States Patent Office 3,487,698
Patented Jan. 6, 1970

3,487,698
PERCENTAGE FAT ANALYZER
Alton Leger, Jr., Roslyn, and Robert C. Whitehead, Jr., Oreland, Pa., assignors to Honeywell Inc., Minneapolis, Minn., a corporation of Delaware
Filed Feb. 6, 1967, Ser. No. 614,278
Int. Cl. G01n 9/02
U.S. Cl. 73—433                                           3 Claims

ABSTRACT OF THE DISCLOSURE

An electro mechanical system is utilized to automatically detect the weight, volume and temperature of a meat sample. A computer operates on the information supplied thereto by the electromechanical system. The computer automatically operates upon these inputs in conjunction with other inputs which represent constants related to the meat sample, in order to produce an output signal. The output signal automatically produced by the computing system is representative of the percentage fat content of the meat sample being processed.

---

This invention relates to a device which is utilized for detecting the percentage of fat in animal tissue. More particularly, the percentage of fat is determined in meat which is packaged for ultimate consumer consumption. The specific invention disclosed herein relates to the control system for supervising the meat analyzing device.

For various reasons, food processors, more particularly meat packers and the like, desire to maintain control over fatty content of a particular package or the like of meat product. For example, governmental regulations require that the fatty content of meat product fall within certain specified limits. The meat processor, in order to obtain, or retain, governmental procurement contracts, desires to maintain the meat products within the specified limits. Additionally, the manufacturer of meat products is desirous of maintaining uniform quality of products in order to retain consumer good will. Therefore, the meat manufacturer is anxious to achieve a method and apparatus for detecting and/or controlling the fatty content of the meat products.

Pertinent to this subject matter is the related U.S. Patent 3,282,115 to R. C. Whitehead, Jr. and W. S. Taylor, as well as the copending applications Ser. No. 556,390, by R. C. Whitehead, Jr. and Ser. No. 536,387, by Whitehead and Taylor (division of Patent 3,282,115). Each of these patents and applications are assigned to a common assignee and relate to various solutions to problems in the meat packaging field. The referenced material, while pertinent to the subject matter described herein, is not anticipatory thereof.

In the past, it has been difficult to achieve this detection and control inasmuch as a relatively uncomplicated scheme therefore was unavailable. The prior method required that the meat analysts obtain a sample, render the sample in any of the usual methods, obtain a liquid form of the fat, measure the fat in relation to the overall weight and volume of the sample and calculate the percentage of fat in the sample. The disadvantages of this method are inherently obvious. That is, the individual samples in a batch may vary from point to point within the sample; and the procedure for obtaining a calculation is slow and tedious. Furthermore, because of the time consumption in performing the test, random testing techniques are used with the inherent sampling shortcomings incident therewith.

In the subject invention, the relationship between weight and volume of a sample is utilized to produce a signal which is a function of the specific gravity of the sample. Thus, the sample is weighed and measured to obtain the weight-volume relationship. The weight and volume indications are supplied to a computer in accordance with a preselected sequence which is controlled by a timing mechanism. The computer operates upon the input signals supplied thereto and produces an output signal which is indicative of the percentage of fat in the meat product. The inputs which are supplied to the computer include the aforementioned weight and volume indications along with a temperature indication. The computer circuitry is designed to compensate for temperature variations inasmuch as variations in temperature in the meat sample will cause a variation in the apparent fatty content of the meat product. The output signal produced by the computer may be in any suitable form which may be directly readable by the operator of the device.

It is an object of this invention to provide a system for calculating the percentage of fat in a meat product.

It is another object of this invention to provide a system wherein the calculation of percentage of fat in a meat product is performed automatically.

It is another object of this invention to provide a system wherein a mechanical device is utilized to weigh and measure the meat sample in question, provide representation of these parameters and to electronically operate upon these representations to calculate the percent of fat in the samples.

These are other objects and advantages of this invention will become more readily apparent when the following description is read in conjunction with the attached drawings, in which;

FIGURE 1 is a block diagram of the system;

FIGURE 2 is a schematic diagram of the mechanical apparatus utilized by the system;

Figure 3:
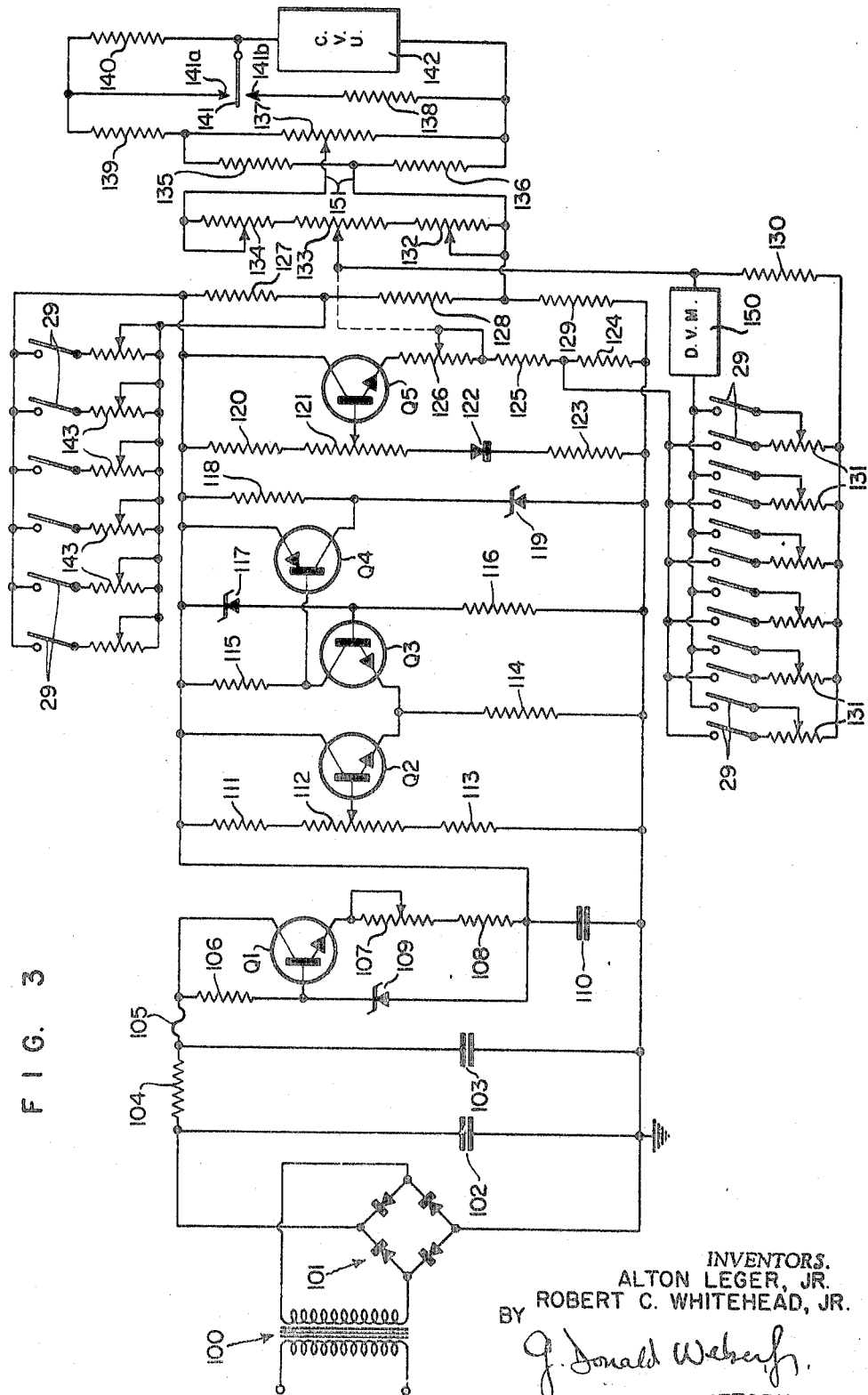
FIGURE 3 is a schematic diagram of one embodiment of the electrical circuit which performs the calculations.

Referring now to FIGURE 1, the block diagram shows, generally, the interconnection of the several components of the system. A start device 1 is connected to volume detector 2 and timer 3. As shown, the start mechanism concurrently applies a signal to detector 2 and timer 3. Alternatively, the start signal could be initially applied to volume detector 2 and, subsequently, to timer 3 either by inserting a delay element in the timer circuit or by having volume detector 2 provide a signal which initiates operation of timer 3. The volume detector is connected to transducer 4 which may be a mechanical-motion type of transducer. Thus, for example, the volume detector may comprise a device having a relatively fixed area and a selectively variable height. A piston, or the like, to which a predetermined pressure is applied moves a variable distance in accordance with the height of a sample being measured. The piston movement is measured to determine the volume of the sample. Transducer 4 is connected to memory 5 along with an input from timer 3. Thus, the mechanical-motion output of transducer 4 requires a finite time to insert information into memory 5 which may be a mechanical memory and which is described in detail hereinafter. Timer 3 supplies a signal to memory 5 such that memory 5 is activated and produces output signals at a propitious time which is sufficiently delayed so that transducer 4 will have fully inserted the signal into memory 5, but is sufficiently early whereby memory 5 has not been subject to deterioration of the signal stored therein. The signals supplied by memory 5 are applied to computer 6 which is described hereinafter. As will appear infra, the signals supplied by memory 5 comprise a signal which directly effects the volume measurement as well as a signal which effects the volume temperature representation. A more detailed description hereinafter, relative to FIGURE 3 will describe the operation of this compensation or correction signal.

Weight detector 7 may be any suitable weighing device, such as a scale. Weight detector 7 may be rendered operative at a time different from the operation of volume detector 2. In the preferred embodiment, weight detector 7 is actually rendered operative subsequent to volume detector 2. The actuation of weight detector 7 is, in part, controlled by timer 3. The output signal from weight detector 7 is connected to transducer 8 which is a pressure to mechanical-motion type transducer. Transducer 8 is described in more detail hereinafter. The output from transducer 8 is also supplied to computer 6. Computer 6 operates on the signals supplied by transducers 4 and 8 and produces an output signal which is representative of the percent of fat in the meat sample. This output signal is supplied to readout device 9 which may be any suitable readout means. In the preferred embodiment, the readout element comprises a plurality of tubes which provide numeric output signals.

Referring now to FIGURE 2, there is shown a schematic representation of the fat analyzing system. The system is constructed, primarily, of frame 11 which is mounted on a suitable base 10. Frame 11 may be fabricated of structural steel or similar elements which are sufficiently strong to carry the entire system. A sub-base 10a is mounted adjacent the base 10 within the frame 11. A weighing device such as a scale 13 is mounted on base 10a. The scale, in the preferred embodiment, is arranged to be movable. More particularly scale 13 is arranged to be raised into engagement with the bottom of legs 12a which are attached to the table 12. The meat sample being analyzed rests upon table 12. Thus, at the propitious moment during the operation cycle of the system, scale 13 is raised into engagement with legs 12a of the floating table 12 whereby the weight of sample 14 is recorded. Alternatively, the scale 13 could be relatively fixed while the table 12 could be selectively lowered against the scale.

A meat die 15 (shown partly broken away), is lowered by means of ram 16 to completely surround the meat sample 14. Since the die and ram are connected to a hydraulic mechanism (not shown) a large pressure may be applied by the die to the sample 14. This permits the shaping of sample 14 as well as measurement of volume as appears hereinafter. In the preferred embodiment, the die and ram system applies a force of approximately 20 tons to the meat sample. For this reason, it is desirable to selectively raise the scale 13 into engagement with legs 12a of table 12 after the pressure has been removed. Die 15 carries therewith a finger element 22 which is attached to the die. Switches 23 and 24 represent upper and lower limit switches, respectively (and are attached, for example, to the frame 11 of the system. Finger element 22 is adapted to selectively trigger the upper and lower limit switches during operation of the system, more especially while ram 16 is raising and/or lowering die 15. Limit switches 23 and 24 are connected to the timer mechanism (see FIGURE 1) and are used to initiate or terminate certain portions of the operating cycle.

A bladder 21 which may be fabricated of tough resilient rubber (for example polyurethane), is mounted in the upper portion of die 15. Bladder 21 rests upon sample 14 which is normally enclosed within a cardboard box. By utilizing a resilient bladder 21, pressure may be applied uniformly across the upper surface of meat sample 14. Bladder 21 exerts pressure by having a fluid, for example water, inserted therein via a flexible hose 20 which is connected to a piston cylinder device 17. In actuality, device 17 may be a double Bellofram wherein air is forced into one chamber of the device from forced air supply source 18. The application of forced air to one chamber creates a pressure against a membrane or piston whereby the fluid in another chamber of device 17 is forced, through hose 20, into bladder 21 thereby to exert pressure on the sample 14.

Rod 19 is connected to the membrane or piston within device 17. Rod 19 is also connected to the mechanically coupled volume measuring apparatus discussed infra. Thus, the displacement of fluid in device 17 is related to the vertical displacement of rod 19 which is converted by a suitable transducer (transducer 4 of FIGURE 1) to a signal indicative of the volume of sample 14.

A panel 25 is mounted on frame 11 for placement of the various display and control buttons related to the computer network. Indicator 9 in panel 25 is the readout device whereby a direct readout in percent of fat in the sample is obtained. Indicator light 9a is operative only when indicator 9 is in proper condition for readout. Pushbuttons 29 represent adjustment switches whereby correction factors may be inserted into the computer circuit (see FIGURE 3) which correction factors relate to different cuts of meat to be analyzed. Panel light 27 is controlled by the timing circuit and indicates the proper time for raising die 15 from sample 14. This light inhibits the operator from effecting a premature removal of the die prior to a satisfactory volume measurement.

Switch 26 represents a potentiometer dial which may be utilized to provide temperature compensation and correction. Through this means, a signal indicative of the temperature of the sample 14 may be inserted into the computer. The potentiometer is manually adjusted to permit circuit compensation for variations therein due to meat temperature. As will appear hereinafter, this manual adjustment may be eliminated and an automatic temperature measurement and setting circuit may be included. Indicator light 30 is illuminated when electric power is applied to the system. Meter 28 registers the deviation in the weight of sample 14 from a predetermined standard. In the preferred embodiment, meter 28 registers ±.75 pound variations.

Panel 31 includes instrumentation which relates to the hydraulic apparatus which controls ram 16 and die 15. Meters 32 and 33 register the pressure supplied to and by the system. Lever 34 is the lever which activates the hydraulic system. Lever 35 is a safety arranged such that operations of levers 34 and 35 is required in order to activate ram 16 and die 15. Safety lever 35 may be eliminated and is not essential to the operation of the device. Furthermore, it is contemplated that a fully automated hydraulic control may be utilized. Such an automated system would require only a typical starting switch to activate the hydraulic device and timing controls.

Briefly, the operation of the device shown in FIGURE 2 is described. A sample 14 is placed on free floating table 12. Lever 34 is depressed along with lever 35. A hydraulic system (not shown) causes ram 16 to move downwardly. Die 15, attached to ram 16, moves therewith. Die 15 surrounds meat sample 14. In the downwardly path, finger 22 trips lower limit switch 24. Switch 24, when tripped, provides a signal to the timing mechanism, for example to start the timer. When sample 14 is surrounded by die 15, forced air supply 18 pumps air into piston chamber 17 causing the pressurized flow of fluid through coupling 20 into bladder 21. Meat sample 14 is compressed to a uniform configuration by the combined die-bladder pressure. As the fluid in device 17 is forced into the bladder 21, rod 19 moves in accordance therewith. That is, as the fluid contents varies, the piston and rod 19 move in proportion thereto. Rod 19, through a mechanical coupling, provides an indication to the computer. This indication is a function of the volume of sample 14. That is, since cross sectional area of the sample remains substantially constant, the volume varies as a function of the height of the sample.

After a predetermined time, as computed by the timer mechanism, raise die light 27 is activated whereby the operator releases lever 34 and 35 (or the system is otherwise activated) such that the hydraulic mechanism reverses its operation wherein ram 16 and die 15 are withdrawn from sample 14. Of course, the fluid in bladder 21 is retrieved by device 17 at this time. In one embodiment, during the upward travel of die 15, finger 22 trips switch 23 thereby again giving an indication to the timer mechanism to resume operation. Alternatively, the timer may be reactivated by the retriggering of switch 24.

At a predetermined time, scale 13 is raised upwardly into engagement with legs 12a of table 12. Scale 13 provides a means for weighing the meat sample 14. This weight measurement is provided to the computer by means of a mechanical, pneumatic or other suitable coupling. Subsequently, scale 13 is retracted and disengaged from table 12. The meat sample may then be removed from table 12.

Thus, it is seen, that the computer network has received a volume signal, as well as, a weight signal. A temperature signal has been inserted by suitable means such as a manually controlled pot coupled to knob 26. Other input signals are supplied by means of pushbuttons 29 which insert known constants into the calibrations and calculations.

At a time subsequent to the weighing operation, indicator light 9a will be activated which indicates that a reading may now be taken at indicator panel 9. At this time indicator panel 9 is locked and the information displayed thereon is the information which relates to the particular meat sample which has just been operated upon. Thus, the operation of determining the fat content of meat sample has been achieved with a minimum time requirement, for example on the order of 38 seconds per determination. Moreover, the calculation has been provided with a minimum of manual operations and a relatively small number of parts.

Referring now to FIGURE 3, there is shown a schematic diagram of the computing network which is utilized with the above described mechanical device. This device incorporates a power supply which is unique in its design because of the specific functions and operations of the computing circuit. For example, the computer circuit, or load for the power supply is a relatively constant current load. Typically, the load current will not vary by more than 10% from the standard.

The input power, which may be 110 volts at 60 c.p.s. is supplied to the primary of transformer 100. The signal is inductively coupled to the secondary of transformer 100. Transformer 100 is connected across two nodes of full wave rectifying bridge 101. The other nodes of bridge 101 are connected to the power supply such that one anode represents the ground or low level side of the circuit and the other node represents the high level side of the circuit. A filter network comprising capacitors 102 and 103 along with resistor 104 is connected across the bridge and effects substantial smoothing of the full wave rectified signal. The high level potential is connected from the filter network, via fuse 105, to a current limiting network. The current limiting network operates as a high series impedance without the attendant power loss of an equivalent resistor. The current limiting network comprises NPN transistor Q1. This transistor may be, for example, a type 2N3583 transistor. The collector electrode thereof is connected to fuse 105. The emitter electrode thereof is connected to variable resistor 107 which provides fine adjustment of the current supplied by this network. Resistor 108 is connected in series with resistor 107 and provides the coarse current limiting function. Resistor 106 is connected between the collector and base electrodes of transistor Q1 to provide a bias current loop. Similarly, Zener diode 109 is connected in the base-emitter circuit, in parallel with resistors 107 and 108. The cathode of Zener diode 109 is connected to the base of transistor Q1. Zener diode 109 provides a constant voltage drop control function, i.e. diode 109 produces a constant voltage drop thereacross in order to produce a substantially constant current through resistors 107 and 108.

Capacitor 110 is connected in series with the current limiting network and in parallel with diode bridge 101 to provide further filtering. The filtering action includes shunting of any stray noise, such as 60 c.p.s. pickup.

A differential amplifier comprising transistors Q2 and Q3, each of which may be NPN type 2N3391A transistors, is connected in parallel with capacitor 110. The collector of transistor Q2 is connected directly to the current limiting network while the collector of transistor Q3 is connected, via resistor 115, to the same junction. The emitters of Q2 and Q3 are connected together and to the low level junction of diode bridge 101 via resistor 114. The base electrode of transistor Q2 is connected to the wiper arm or movable tap of variable resistor 112. Resistor 112 is connected in series with resistors 111 and 113 which are connected to opposite terminals of resistor 112. Resistor 111 is further connected to the current limiting network while resistor 113 is further connected to a common junction at diode bridge 101 which junction may be connected to ground. The base electrode of transistor Q3 is connected to the voltage divider network comprising Zener diode 117, which has the cathode thereof connected to the current limiting network, and resistor 116. Resistor 116 is connected between base electrode of transistor Q3 and the common junction or ground potential. It should be noted that Zener diode 117, because of providing a substantially constant voltage drop thereacross, is utilized in conjunction with resistors 111, 112, 113 and 116 to generate an error signal as the regulated voltage varies. The error signal is detected at the bases of transistors Q2 and Q3. That is, the usual junction voltage variations due to temperature are automatically compensated for in this circuit configuration.

The differential amplifier is operative to control the potential supplied to the base of PNP transistor Q4 which may be a type 2N2908A transistor. The base of shunt transistor Q4 is connected to the collector electrode of transistor Q3. The emitter electrode of transistor Q4 is connected to the current limiting network. The collector electrode of transistor Q4 is connected to the center junction of a voltage divider network comprising resistor 118 and Zener diode 119. Zener diode 119 has the anode thereof connected to the common or ground potential junction and the cathode connected to the collector electrode of transistor Q4. Resistor 118 is connected between the collector and the emitter electrodes of transistor Q4. The shunt network is operative to bleed off any excess current supplied by the current limiting network.

The foregoing description relates to the power supply portion of the network. This power supply produces a substantially constant output of approximately 107 volts D.C. The voltage provided by the power supply is supplied to the computing network as hereinafter described.

A voltage divider network comprising resistor 120, variable resistor 121, silicon rectifier diode 122 and resistor 123 are connected across the output of the power supply. Diode 122 has the dual function of providing compensation for the offset voltage drop, as well as any temperature related variations in junction voltage drop exhibited by transistor Q5. Resistors 120 and 123 provide, in effect, a coarse adjustment which is related to a standard or reference signal related to a standard weight of a meat sample which is to be examined by the apparatus. Variable resistor 121 provides a fine adjustment on the variations in weight of the meat samples. In a preferred embodiment, resistor 121 is a pneumatically positioned potentiometer which is connected to the scale or weighing device 7. Resistor 121 has the position of the wiper arm thereof altered in accordance with variations in weight of the sample, relative to the predetermined standard. The variation in position of the wiper arm of resistor 121 is also effective to vary the signal supplied to the base of transistor Q5.

Transistor Q5 is an NPN transistor type 2N3391A. The collector electrode of transistor Q5 is connected to the high level voltage input supplied by the power supply and the emitter of transistor Q5 is connected to one end of a voltage divider network comprising variable resistor 126, and resistors 124 and 125. The other end of the voltage divider network, namely one terminal of resistor 124, is connected to the aforesaid ground junction. Variable resistor 126, which is connected to the emitter electrode of transistor Q5, has the variable or wiper arm thereof ganged with the wiper arm of variable resistor 133. Resistor 133 is related to the temperature correction function as will be described hereinafter. However, it should be noted that variable resistor 126 will be adjusted by the volume measuring apparatus to provide a fine adjustment in the transistor Q5 circuitry whereby the output signal at the emitter electrode of transistor Q5 is substantially proportional to the weight of the sample. For example, in one embodiment the voltage is about +100.0 volts for a 60 pound sample.

Resistor 125, which is connected between variable resistor 126 and resistor 124, has the junction with 124 connected to one terminal of a plurality of switches 29. These switches are the same switches 29 which are shown on panel 25 in FIGURE 2. Switches 29 comprise a plurality of contacts which are normally open. When closed each of switches 29 is individually connected to one terminal of one of a plurality of similar variable resistors 131. Resistors 131 are all set to predetermined values in accordance with a correction factor or parameter which is related to the type of meat which is being sampled. The value of the resistors may all be different for different type or cuts of meat. The variable tap on each of resistors 131 is connected, via another pair of contacts of switch 29, to digital volt meter 150. The digital volt meter may be any standard type of circuit which includes means for controlling a suitable readout device such as readout 9 shown in FIGURE 2. In addition, means are provided in the DVM circuit for selectively disabling the circuit with regard to receiving input signals. Digital volt meter 150 is connected, via resistor 130, back to the other terminals of variable resistors 131. Thus, it is seen that operation of one of switches 29, as noted in the description of FIGURE 2, operates to close the two contacts associated with one of variable resistors 131 whereby the preset value thereof is connected in series between the junction of resistors 124 and 125 and one side of the digital volt meter 150. If no switch 29 is depressed, digital volt meter 150 is not connected into the circuit and a readout thereby is not possible. Although not pertinent to the invention, per se, switches 29 include a plurality of additional contacts. These contacts may be interconnected to assure that only one switch is activated. Other contacts provide a "lock-in" function and an illumination function.

Concurrently, with the operation of any switch 29, a further pair of contacts are closed. Operations of this portion of any of switches 29 inserts the resistance of one of the variable resistors 143 in parallel with fixed resistor 127. Resistor 127 is connected in series with resistors 128 and 129 to form a voltage dividing network between the terminals of the power supply. Thus, since resistors 143 are also preset in accordances with the type of meat being sampled, the actuation of a switch 29 will insert a predetermined constant in the form of a variable resistance in parallel with the fixed resistor 127. This variable parallel resistor has the effect of varying the effect of the fixed resistor 127 in the voltage divider path. It may be noted, that the adjustments effected by the variable resistors 143 are utilized to effect a zero correction while resistors 131 effect a span correction in the measuring network. Moreover, as suggested supra, each of identical variable resistors 143 or 131 is preset and remains constant.

Since the apparent volume of the sample is effected somewhat by temperature, temperature compensations are provided. The temperature compensation or correction network includes a constant voltage unit 142. Such CVU elements are commercially available. In the prefered embodiment, CVU 142 provides a voltage of approximately 4.2 volts. At the negative or low voltage terminal, there is connected one terminal of resistor 138. In addition, at the aforesaid low voltage terminal there is connected one end of a bridge comprising resistors 135 and 136 connected in series and variable resistor 137 connected in parallel with the series combination of resistors 135 and 136. The total value of resistors 135 and 136 is designed to be equivalent to the total value of the resistance of resistor 137. At the other end of the parallel resistor bridge, is connected one terminal of resistor 139. Resistor 139 is connected in series with resistor 140 which is returned to the positive terminal of CVU 142. The armature of switch 141 is connected to the aforesaid positive terminal of CVU 142. This switch has contacts 141a and 141b. Switch 141 is selectively switched between these positions. In the preferred embodiment, contact 141a is the normally closed position of switch 141 and contact 141b is the normally open contact. Switch 141 and variable resistor 137 are controlled by dial 26 on panel 25 of the apparatus shown in FIGURE 2. This apparatus is more fully described when referring to FIGURE 5. However, it should be noted that resistor 137 is a resistor which, in this embodiment, is manually controlled to insert a temperature parameter into the system. When resistor 137 is in one position, for example near the high resistance end, switch 141 is in one position. On the contrary when resistor 137 is in the other condition, for example near the low resistance end, switch 141 assumes the opposite position. Swith 141 alternatively shunts the resistor 140 and disconnects resistor 138 from the circuit or insert reistor 138 in parallel with CVU 142 and inserts resistor 140 in series therewith. Because of the respective values of the resistors associated with CVU 142, the impedance of the reistor network connected across CVU 142 remains substantially constant regardless of the position of swicth 141. However, the potential across the resistance bridge network varies by a factor of 2:1. Consequently, a variable voltage which is adjusted for a correction regarding the temperature is supplied via wires 151. It will be understood that the potential supplied between wires 151 is larger than the voltage necessary to supply the required correction signal.

Signals supplied by the temperature correction network are supplied to a further correction apparatus network which provides a voltage adjustment which is related to the percentage of fat in the sample. That is, as will appear hereinafter, there is a relationship between the apparent volume to meat sample and the temperature of the sample. Consequently, when a signal indicative of a temperature variation from the standard is inserted, a correction for the inherent variation in apparent fat percentage vs. temperature must be included also. Consequently, the volume pot 126 is ganged with volume pot 133 as noted supra. Therefore, the volume pot 126 is varied due to the vertical movement of rod 19, pot 133 is also altered.

Potentiometer 133 is connected in series with potentiometers 132 and 134. These variable resistors are connected in series to provide a voltage divider network. Potentiometer 134 is initially set to a predetermined value which is representative of a standard signal which is arbitarily assigned as a zero correction factor for the temperature at which the system is normally expected to operate. Resistor 134 may be considered to be a "span" adjustment for the circuit. Thus, the correction voltage, noted supra, may be selectively reduced. Variable resistor 133 is varied in accordance with the volume potentiometer and represents a variation in the volume of the sample. Resistor 132 provides a zero offset and fine adjustment for the correction value.

Since the signal applied across potentiometer 133 includes a temperature correction factor, and a volume vs. temperature factor (potentiometers 132 and 134), resistor 133 operates to include these corrections in the overall calculation of percentage fat in the sample. That is, the movable tap of variable resistor 133 is connected to one terminal of resistor 130 and the common junction thereof with the digital volt meter 150. The other terminal of the voltage divider, namely a terminal of resistor 132 (specifically, the terminal connected to wire 151), is connected to the junction between resistors 128 and 129. Thus, a correction voltage factor is inserted in series with DVM 150.

The operation of the circuit shown in FIGURE 3 is described. The power supply portion of the network has been described supra and provides a relatively fixed voltage across the inputs to the computing network. The philosophy of the computing network is to operate on the analogy between the equation for calculating specific gravity and the well known Ohm's law. The specific gravity equation is:

$$S.G. = W/V$$

Where S.G.=specific gravity, W=weight, and V=volume. Recognizing that this formula is analagous to Ohm's law, namely $$I = E/R$$

Where I=current, E=voltage and R=impedance, the following function is performed. As described, the voltage divider network comprising resistors 120, 121, 123 and diode 122 is connected across the power supply input. This voltage divider network further represents the standard weight of a sample with variable resistor 121 providing the indications of variations, if any, in the weight of the sample under test. Thus, the voltage (E) supplied to the base electrode of transistor Q5 is representative of the weight (W) of the sample under test.

The total impedance (R) of voltage divider network comprising resistors 124, 125 and 126 represents the volume (V) of the sample under test. As noted, the total resistance of resistors 124 and 125 effectively represents the volume of a predetermined standard. The variations produced by variable resistor 126 indicate the variations, if any, of the actual sample from the predetermined standard. The resistance string comprising resistors 124, 125 and 126 are connected to the emitter electrode of transistor Q5. The voltage (E) which is proportional to weight (W) is applied to the base electrode of transistor Q5. The current flow in the resistor string connected to the emitter electrode of transistor Q5 is a function of the voltage and resistance where the voltage is effectively controlled by the input applied to the base of transistor Q5. Thus, the current (I) in the resistor string is repesrentative of the specific gravity (S.G.) of the sample under test. Since it is easier to measure the voltage across a resistor rather than to measure the current through a resistor, the voltage drop across fixed resistor 124 is a function of the current therethrough. Consequently, the voltage drop across resistor 124 is also representative of the specific gravity of the meat sample under test.

Figure 4:
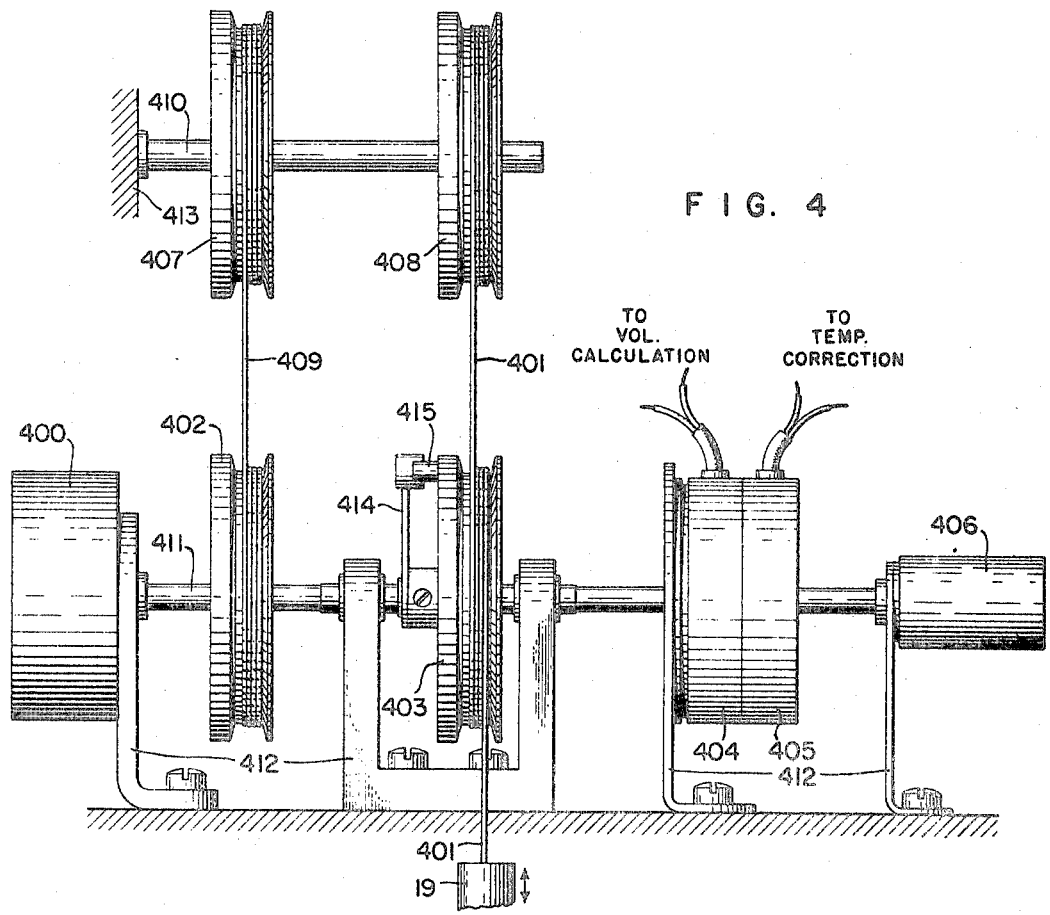
FIGURE 4 is a schematic representation of the mechanical coupling which drives the volume representing potentiometers.

Referring now to FIGURE 4, there is shown the mechanical coupling which represents the transducer 4 and memory 5 as shown in FIGURE 1. In FIGURE 4, the top of rod 19 is shown. The path of motion of rod 19 is shown by the arrow. A cable 401 of any suitable configuration and material preferably a non extensible type material is linked to the end of rod 19. Cable 401 is wrapped around the cylindrical portion of drum 403 between the flanges thereof. Cable 401 continues to and is wrapped around and fastened to drum 408. Drum 403 is loosely mounted on shaft 411 such that drum 403 may rotate around the shaft in response to urging by cable 401 without turning shaft 411. Drum 408 is spring loaded relative to shaft 410 so that the cable 401 is maintained under tension at all times. Similarly, drum 407 is spring loaded on shaft 410 and maintains tension on cable 409 which is wrapped around and secured to drum 402 and 407. Shaft 410 is mounted in a suitable mounting arrangement which is diagrammatically represented by support 413.

Drum 403 is loosely mounted on shaft 411 so as not to rotate therewith. Drum 402 is fixedly mounted on shaft 411 and rotates therewith thereby causing rotation of shaft 411 due to the spring loaded drum 407 operating via cable 409. Potentiometers 404 and 405 are mounted on shaft 411 in such a manner that the wiper arms thereof are fixedly attached to the shaft 411 and rotate therewith. Consequently as shaft 411 rotates, the resistance detected between the leads of potentiometers 404 and 405 varies. Magnetic brake 406 is attached to shaft 411 such that when the magnetic brake is deenergized shaft 411 is not free to rotate. However, when brake 406 is energized, shaft 411 rotates freely. A hydraulic dashpot 400 is coupled to the opopsite end of shaft 411. The object of dashpot 400 is to avoid a sudden acceleration or deceleration of shaft 411, especially in relation to the interraction between arm 414 and pin 415. Pin 415 is affixed to one flange or end of drum 403. Arm 414 is affixed to shaft 411. The apparatus related to shaft 411 is mounted by any suitable mounting means such as diagrammatically represented by mounting 412.

In operation, during the portion of the cycle wherein the volume of the meat sample is being ascertained, the piston means 17 (FIGURE 2) operates wherein rod 19 moves vertically. For example, the rod may move upwardly. As rod 19 moves upwardly, cable 401 tends to become slack. However, spring loaded reel 408 tends to take up any slack in the system. Rotation of spring loaded drum 408 causes rotation of drum 403 through the action of cable 401. As drum 403 rotates, pin 415 strikes against and engages rim 414. Arm 414 is then driven by pin 415 on drum 403 through an arcuate path which is related to the linear motion of rod 19. As arm 415 rotates, it drives shaft 411 which is affixed thereto. Rotation of shaft 411 causes, as noted supra, a variation in the wiper arm position in potentiometers 404 and 405. Potentiometers 404 and 405 are equivalent to variable resistors 126 and 133 as shown in FIGURE 3.

After arm 414 has been driven, but before the volume measurement terminates whereby rod 19 would move downwardly, the timing means operates to actuate magnetic brake 406 which clamps shaft 411 and inhibits rotation thereof. Brake 406 must supply sufficient retardation or friction to overcome the tendency for spring loaded drum 407 to drive shaft 411. That is, drum 407 tends to drive shaft 411 through the agency of cable 409, which is wrapped around and fastened to drum 402 which drum is fastened to shaft 411.

Thus, once shaft 411 is clamped by brake 406, rod 19 may be returned to its original position. During this movement, cable 401 is pulled by rod 19 causing rotation of drum 403 to the initial position. This rotation disengages pin 415 from arm 414 and places the volume measurement apparatus in the condition for the next operation. Concurrently, pots 404 and 405 are maintained in the position indicative of the previous volume due to the brake 406.

Subsequent to the volume measurement, as will appear hereinafter, the timer mechanism applies a signal to brake 406 which releases shaft 411. The combination of spring loaded drum 407 acting through cable 409 which is attached to drum 402 causes shaft 411 to rotate to the initial condition.

As noted supra, hydraulic dashpot 400 operates on shaft 411. The dashpot supplies a damping or braking action whereby shaft 411 does not rotate at an extremely high rate of acceleration or deceleration in response to being driven by either of the driving means associated with cables 409 or 401. Consequently, damage or misalignment specially of pin 415 and arm 414 are avoided.

Figure 5:
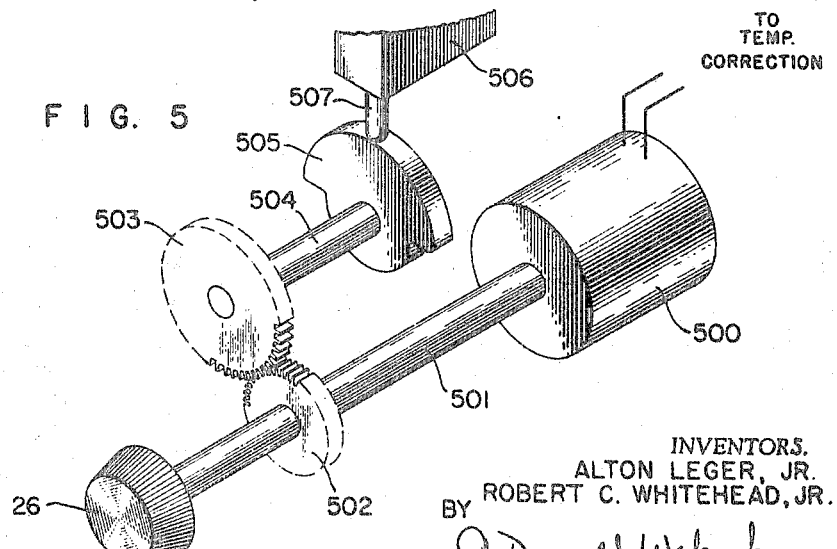
FIGURE 5 is a perspective representation of the mechanical coupling for driving the temperature correction potentiometer.

Referring now to FIGURE 5, there is shown a schematic representation of the temperature correction mechanism. Knob 26 is the knob shown on panel 25 in FIGURE 2. This knob is manually operated to apply to the computer electrical signals representative of predetermined temperature coefficients. Knob 26 is connected, via shaft 501, to potentiometer 500 which is similar to resistor 137 in FIGURE 3. Rotation of shaft 501 causes variation in the voltage output of the bridge formed by resistors 135, 136 and 137. Rotation of shaft 501 also causes rotation of gear 502. Gear 502 engages gear 503 which has a 2:1 ratio relative to gear 502. Rotation of gear 503 drives shaft 504 to which is connected the half-cam 505. Button 507 of switch 506 bears upon the surface of cam 505. Switch 506 is equivalent to switch 141 of FIGURE 3.

It is noted that because of the 2:1 ratio in gear train 502 and 503, controlled operation of cam 505 is obtained. Furthermore, it should be noted that as suggested supra, a predetermined temperature having zero temperature correction requirements is available. Above this zero correction temperature, switch 141 (FIGURE 3) is closed. Below the predetermined temperature, switch 141 is opened. Thus, cam 505 represents two stable states, one for each of the levels of the cam. By manually adjusting knob 26, cam 505 is rotated and the different levels thereof are located adjacent switch 506 wherein switch 506 is either opened or closed as the case may be.

The manual adjustment shown in FIGURE 5 represents one embodiment of the invention. As will be described hereinafter, other means may be utilized for controlling the position of resistor 136 and switch 141.

Figure 6:
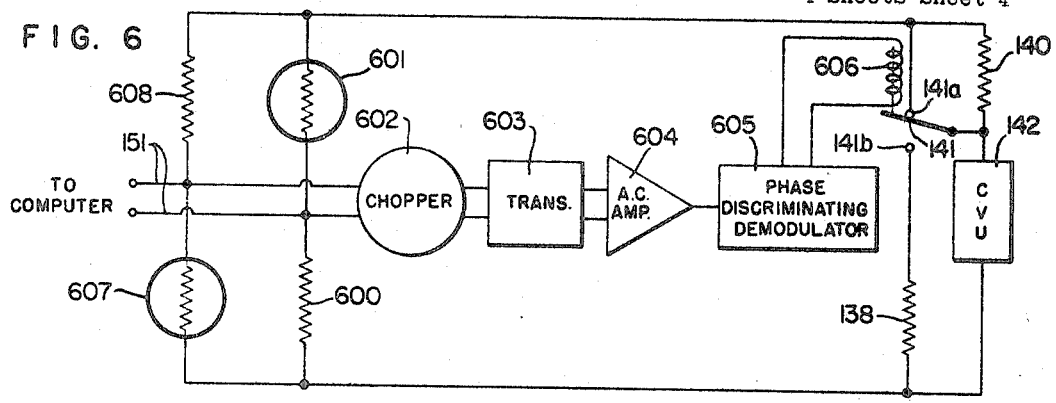
FIGURE 6 is a schematic diagram of a portion of the circuit shown in FIGURE 3 and represents another embodiment thereof wherein automatic temperature compensation is made.

Referring now to FIGURE 6, there is shown a schematic diagram of a modification of the circuit shown in FIGURE 3. This embodiment represents an automatic temperature measurement of the meat sample and eliminates the manual setting of resistor 137 by the operator accomplished by rotating knob 26 as shown in FIG. 5. In FIGURE 6, components which are identical to those shown in FIGURE 3 bear similar reference numerals. Thus, the constant voltage unit 142 is connected to resistor 138 and resistor 140. Switch 141 is connected to the junction between the high level terminal CVU 142 and one terminal of resistor 140. The armature of switch 141 is selectively connected with contacts 141a and 141b. The resistance bridge network is connected across the CVU 142. The bridge network comprises a first leg including fixed resistor 607 and resistance thermometer 608 connected in series. In the other leg fixed resistor 600 and resistance thermometer 601 and connected in series with each other and in parallel with the first resistance leg. The resistance thermometers are adapted to be inserted into the meat sample, as for example by placing such thermometers in the die whereby the meat is penetrated when the die is lowered. The temperature of the meat will cause a variation in the impedance of resistance thermometers 608 and 601. The bridge network will then produce a voltage signal which will be applied to chopper 602. The output from 602 is transformer coupled, by transformer 603, to A.C. amplifier 604. Amplifier 604 provides a signal to phase discriminating demodulator 605 which is connected to coil 606 which is associated with the armaturer of switch 141. Discriminator 605 permits only one polarity signal to activate solenoid coil 606.

It is seen that this circiut is bistable as was the cam controlled apparatus. That is, if the temperature of the meat is below the prescribed zero correction temperature, the resistance of thermometers 600 and 601 will be changed whereby a slightly elevated voltage will be applied to chopper 602 and, ultimately, to relay 606. Coil 606 causes switch 141 to disengage from contact 141a thereby removing the shunt around resistor 140 and to engage contact 141b thereby inserting resistor 138 into the circuit. The voltage applied to the terminals of the bridge network is much further reduced because of the attenuation due to resistor 140. This potential being smaller tends to drive the potentail applied to chopper 602 much lower thereby maintaining a current in coil 606 and assuring that switch 141 remains in the position contacting terminal 141b.

The converse operation applies when the meat temperature rise above the indicated standard. Thus, switch 141 remains in the normally closed position (shorting resistor 140) such that the potential supplied to the resistance bridge remains high. Thus, as the resistance of the resistance thermometer portion of the bridge varies, the voltage output at lines 151 varies. This variable voltage is representative of the necessary correction required because of a temperature deviation from the predescribed standard. As this voltage varies, the voltage signal inserted in series with DVM 150 (including the percentage fat correction) varies. These variations are designed to correct or compensate for any temperature variations in the sample relative to the reference standard.

Figure 7:
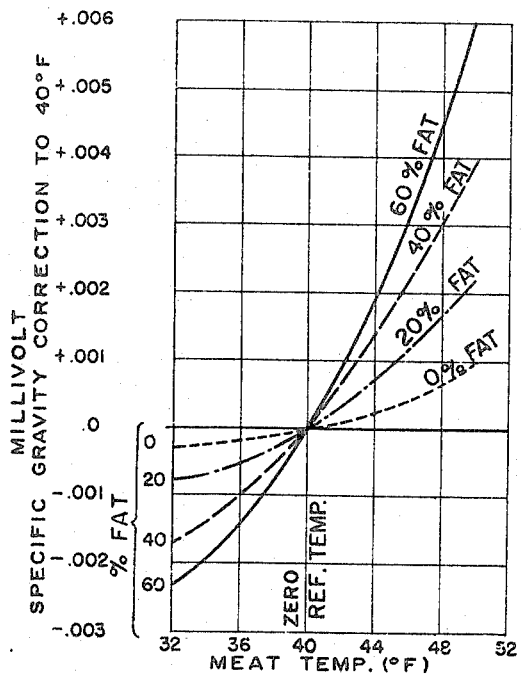
FIGURE 7 is a graph showing the relationship between temperature and a unit of measurement of the meat sample.

Referring now to FIGURE 7, there is shown a graph which indicates typical temperature correction factors. This graph is suitable for certain meats, for example the flank cut of beef and represents a family of curves therefor. Different cuts of meat are represented by graphs having different characteristics. For example, a pork graph would be very nearly linear.

The graph shown in FIGURE 7 references specific gravity (S.G.) as the units of the left-hand ordinate with millvolt correction factors affixed to the right-hand ordinate. Temperature, in degrees Fahrenheit, is designated on the abscissa. The family of curves represents different percentages of fat in a meat sample.

In the graph indicated, the temperature variation is between 30° and 50° F. An arbitrary zero reference temperature is designated at the 40° F. temperature. This temperature is assigned the value of zero specific gravity unit corrections. The specific gravity correction varies from zero to +.006 when the temperature of the meat sample rises above 40° F. The specific gravity unit correction factor varies between zero and −.003 when the temperature of the meat sample falls below 40° F.

As is seen in the graph, zero precent fat is offset from the zero percent fat S.G. correction level. This offset value is inserted by resistor 132. The millivolt signals on the right ordinate are varied by the span adjustment pot 134.

It is easily seen from the graph that the correction factor is non-linear around the 40° F. temperature. That is, below the 40° temperature the slope of the characteristic is approximately 1:2 relative to the slope of the characteristic above 40° F. Thus, the correction network shown in FIGURE 3 inserts and/or removes certain resistors e.g. 140 and 138 from the network connected to the CVU 142. The selective connection of these resistors alters the voltage drop across the bridge network in a 2:1 ratio and this causes a change in the slope of the millivolt correction signal. The 40° F. temperature which is selected in this embodiment is that temperature at which the operations of the meat sampling are to be performed. The assigned value of 40° F. for zero specific gravity correction factor may be varied by varying the temperature at which the meat is to be operated upon or by varying the type of meat to be operated upon.

As is seen in the graph, zero percent fat is offset from of correction factors for 0, 20, 40 and 60 percent of fat in the meat sample are reproduced. In order to substantially linearize the curves while reducing the maximum error in this linearization process, a straight line is projected through the midpoint of the characteristic curve. This line is shown dashed with the millivolt signal required to effect this correction factor being indicated at the right ordinate intercept. This millivolt signal is the correction signal supplied in series with DVM 150.

Figure 8:
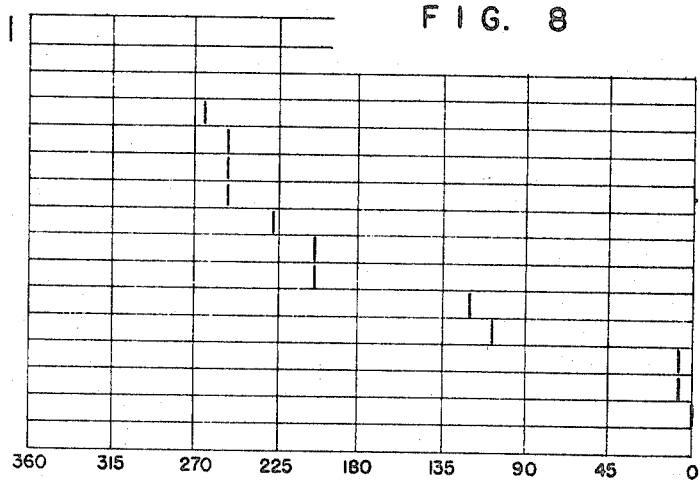
FIGURE 8 is a timing diagram showing the system operation.

Referring now to FIGURE 8 there is shown, in graph form, a timing diagram for the system. The timing sequence is in terms of degrees where a full cycle is represented by 360°. The process is arbitrarily designated as commencing at 360°. In a typical process, the full cycle operation requires about 38 seconds.

The initial signal in the "Start Process" line is shown somewhat prior to the 360° designation. This situation is indicative of the fact that the operator of the machine may, at some indeterminate time, start the process by actuating lever 34 (see FIGURE 2) wherein the die begins its downward movement. The die apparatus may trip the limit switch and thereby start the timer immediately. Alternatively, because of a possible necessity of overdrive of the press associated with the die, a delay may be inserted in the system. However, the timer starts when the timer switch is activated and thereafter substantially controls the timing cycle.

When the timer is started, bladder 21 is pressurized as described supra. While the bladder is pressurized and the die surrounds the meat sample, the volume is being measured and the volume pot is being driven as necessary. At a time equivalent to about 264°, magnetic brake 406 is actuated and the volume pots are locked in position. Shortly thereafter, the bladder may be depressurized by removing the forced air supply input. The "Raise Die" light or indicator 27 is rendered operative at a time period represented by approximately 252° in the cycle. It is noted that the bladder is depressurized subsequent to the locking of volume pot and prior to or concurrent with the indication by the Raise Die light.

As soon as the Raise Die light is operative, the die may be raised automatically by the operator. The raising of the die is indicated to occur at 252°. However, in a non-automatic operation, operator reaction time will insert a delay at this time. It should be noted in a non-automatic operation, the timing cycle may be automatically terminated at a time simultaneous to or subsequent to the time period when the Raise Die light is on. Raising the die will then trigger the upper limit switch, for example, thereby reinitiating the timing cycle. The Raise Die light will be turned off when the cycle is reinstituted. A typical time period is approximately 228°.

At approximately 204° a signal is supplied to the mechanism associated with scale 13 whereby the scale is lifted and the sample is weighed. When the scale is raised into weighing position, a signal is supplied to the readout network in order to unlock or unclamp the operation thereof. Thus, the computer can operate upon the various inputs supplied thereto and drive the readout indicator 9 until a final figure or indication is provided. This final indication will be provided in a relatively short time.

At approximately 120°, the readout indication has finalized and a signal is supplied to the readout device which clamps the readout device whereby the signal displayed thereby cannot be further altered until the next cycle. At approximately 108° the scale is lowered into the initial position. At approximately 6° the volume pot is unlocked by means of releasing the magnetic brake. Simultaneously, the readout light which signifies the availability of the readout signal is also turned off. When the timer reaches zero degrees, the cycle has been completed and the machine is now in condition to discharge the sample, receive another sample and to receive further information to perform another percent fat analysis.

Thus, there has been described a system wherein the percentage fat content of a sample piece of meat may be analyzed and computed. A computed percentage value is then made available through a suitable readout device. The information may then be assigned to the sample by means of a label, tag or the like such that the percentage fat content of the meat in question may be easily detected.

There is included a description of a preferred embodiment, several modifications, and a sequential description of the functional operation of the device. It is obvious that further modifications may be made in or to various components of the device or in the specific sequence described. However, those modifications which fall within the scope of this invention are meant to be included in the description.

The embodiments of the invention in which an exclusive property or privilege is claimed are defined as follows:

1. Apparatus for automatically measuring the percent of fate in compressed animal tissue, comprising a first electric means for measuring the volume of said animal tissue and providing an electrical signal representation thereof, a second electric means for measuring the weight of said animal tissue and providing a electrical signal representation thereof, a third electric means connected to said volume and weight measuring means to perform an operation upon said electrical signal representations of said weight and volume measurements to detect the percent of fat in said animal tissue and to provide an electrical signal representation thereof, a fourth electric signal producing means connected to the third means for measuring the temperature of said animal tissue and to automatically supply an electrical compensating signal to said third means such that said representation of said percent of fat in said animal tissue is more accurate and the undesired effects of variations that occur in the temperature condition of the animal tissue under measurement have on said percent of fat representation is substantially minimized and wherein said third means is a computing means, said first volume measuring means is comprised of a wiper in slidable contact with a resistance in said computing means to convert the movement of a movable part whose motion is proportional ot the volume of said animal tissue into movement of said wiper along said resistance and to alter the signal representative of fat in the animal tissue being produced by said computer in accordance with the magnitude of the volume of said tissue, said temperature compensating signal producing means being comprised of a wiper in slidable contact with a second resistance and said last mentioned wiper being connected to the first mentioned wiper for movement along said second resistance to modify the measured temperature signal in accordance with the volume of the animal tissue under measurement.

2. The apparatus defined in claim 2 wherein said computing means comprises, a power supply means, means to convert said weight representation into a voltage, said power supply means, said weight to voltage converter and the previously mentioned volume to resistance converting means being operably connected to produce an electric signal proportional to the specific gravity of the animal tissue, an additional means operable to perform a subtracting operation on said last mentioned signal and to produce a resulting signal, and a digital readout unit operably connected to said subtracting means to indicate the magnitude of the resulting signal in percent fat in said animal tissue.

3. The apparatus recited in claim 1 wherein said temperature compensating means comprises, a resistance bridge means, a pair of thermal resistance means forming legs of the bridge means that are positioned to sense the temperature of the animal tissue, and whose resistance varies as a function of said temperature, a means for supplying a voltage to the bridge, said bridge being constructed to produce a zero voltage output to the computer means for a preselected temperature of the animal tissue, a means for sensing the polarity of the output of the bridge when said temperature is above or below the preselected zero voltage value, a switching means for changing the voltage supplied to the bridge in accordance with the porality being sensed by the polarity sensing means so that the voltage output of the bridge to the computer will be varied at one rate when said temperature is at a value above said preselected temperature and varied at a different rate when said temperature is at a value below said preselected temperature, and the voltage output of said bridge providing the measured temperature signal that is modified by said movement of said last mentioned wiper.

References Cited

UNITED STATES PATENTS

| | | | |
|---|---|---|---|
| 2,667,782 | 2/1954 | Shea | 73—149 |
| 3,282,115 | 11/1966 | Taylor et al. | 73—432 |

RICHARD C. QUEISSER, Primary Examiner

JOHN K. LUNSFORD, Assistant Examiner